United States Patent [19]
Lowry et al.

[11] Patent Number: 5,848,425
[45] Date of Patent: Dec. 8, 1998

[54] SYSTEM AND METHOD FOR DISPLAYING ALPHANUMERIC DATA IN A THREE DIMENSIONAL GRID

[75] Inventors: Scott Davidson Lowry, Frisco; Robert M. Lowry, III, Plano, both of Tex.

[73] Assignee: Electronic Data Systems Corporation, Plano, Tex.

[21] Appl. No.: 674,392

[22] Filed: Jul. 1, 1996

[51] Int. Cl.[6] ..................................................... G06F 17/00
[52] U.S. Cl. ........................................... 707/503; 707/205
[58] Field of Search ...................... 707/504, 503, 707/517, 518, 519, 523, 522, 903, 904, 205

[56] References Cited

U.S. PATENT DOCUMENTS

| | | | |
|---|---|---|---|
| 5,317,686 | 5/1994 | Salas et al. | 707/503 |
| 5,359,724 | 10/1994 | Earle | 707/205 |
| 5,416,895 | 5/1995 | Anderson et al. | 707/503 |
| 5,437,006 | 7/1995 | Turski | 707/503 |

OTHER PUBLICATIONS

"The Information Visualizer" advertisement, *Xerox Palo Alto Research Information Sciences and Technologies Lab*, 1993, one page.

"vrTrader The Visual Portfolio Manager" advertisement, *Avatar Partners,* date unknown, one page.

Joe Dysart, "Wall Street Meets VR: Animated Investment Tracking," *Virtual Reality World,* Sep./Oct. 1994, pp. 22–25.

"Analysis, Visualization and Presentation Tools for Scientific and Engineering Application Development—agXToolmaster," advertising brochure, *UNIRAS®,* date unknown, 4 pages.

"AVS . . . The Leader in Data Visualization" advertising brochure, *Advanced Visual System Inc.,* 1993, 3 pages.

Nahum Gershon and Stephen G. Eick, "Visualization's New Tack:" *IEEE Spectrum,* Nov., 1995, pp.m 38–56.

"Fig. 7, 8, 9, and 10," *Communications of the ACM,* vol. 36, No. 4, Apr. 1993, pp. 67 and 69.

*Primary Examiner*—Joseph H. Feild
*Assistant Examiner*—John L. Young
*Attorney, Agent, or Firm*—Wei Wei Jeang; L. Joy Griebenow

[57] ABSTRACT

A display system (10) displays alphanumeric data in a three dimensional grid (58). The grid (58) may include data entries (72), planes (72, 74, 76), labels (90, 92, 94), and various graphics (102, 106, 110) that visually represent the data entries (70). A user of display system (10) can modify, orient, or otherwise manipulate the grid (58) to visualize alphanumeric data in three dimensions.

20 Claims, 8 Drawing Sheets

SYSTEM AND METHOD FOR DISPLAYING ALPHANUMERIC DATA IN A THREE DIMENSIONAL GRID

TECHNICAL FIELD OF THE INVENTION

This invention relates in general to display systems, and more particularly to a system and method for displaying alphanumeric data.

BACKGROUND OF THE INVENTION

The difficulty in dealing with repositories of information increases as the information complexity, density, and volume increases. Traditional tools for analyzing information, such as written ledgers or computer spreadsheets, may be inadequate. Recently, data visualization aided by computer graphics is one approach that may simplify the problem of information analysis.

Data visualization enables people to use their eyes as well as their brain to extract knowledge more efficiently and find relationships in information. A number of display systems exist for graphically representing data in both two dimensional and three dimensional space. For example, a host of display systems have been developed for representing, analyzing, graphing, and otherwise displaying information in two dimensions. Moreover, some existing display systems possess limited capabilities to visually display the value of numeric data in three dimensions.

SUMMARY OF THE INVENTION

In accordance with the present invention, the disadvantages and problems associated with display systems and methods have been substantially reduced or eliminated. In particular, a system and method are disclosed for displaying alphanumeric data in a three dimensional grid.

In accordance with one embodiment of the present invention, a system for displaying alphanumeric data in a three dimensional grid includes a first memory that stores the alphanumeric data and associated display data. A processor is coupled to the first memory and transforms the alphanumeric data and the display data into a format for display. A display coupled to the processor displays the alphanumeric data and the display data in the three dimensional grid.

Important technical advantages of the present invention include a system and method for displaying alphanumeric data in a three dimensional grid. Planes associated with one or more of the three axes of the grid may be added, deleted, and moved throughout the grid to highlight selected portions of the alphanumeric data for better presentation to the user. In addition to planes, the display system generates labels, graphs, charts, and other elements to enhance visualization of the alphanumeric data. The user may provide input in the form of positional data to orient the grid to view the data and the elements from a selected perspective. Furthermore, the display system includes a spreadsheet module that allows a user to modify selected portions of the alphanumeric data. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

Figure 1:
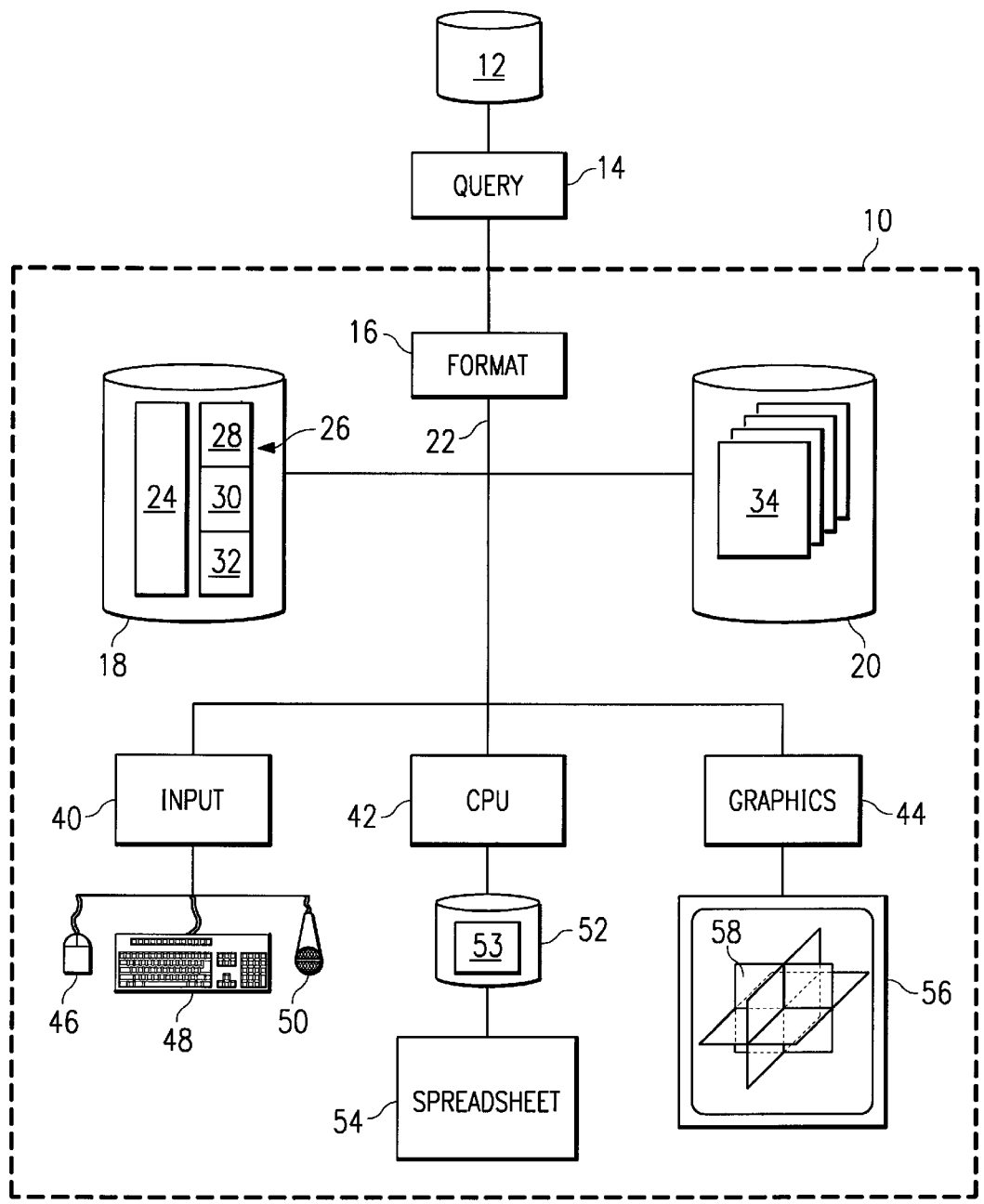
FIG. 1 illustrates a display system in accordance with the present invention.

FIG. 1 illustrates a display system 10 for displaying alphanumeric data in a three dimensional grid 58. A data source 12 contains data for display that is extracted by query module 14 and passed to display system 10. Data source 12 and query module 14 may be separate from or integral to display system 10. In general, display system 10 formats, augments, displays, and visually manipulates alphanumeric data in grid 58.

Display system 10 includes a format module 16 that couples to database 18 and database 20 using bus 22. Database 18 stores data 24 for display, such as alphanumeric data, and associated display data 26. Display data 26 may include one or more of the following: element data 28 for defining planes, labels, graphs, charts, or other textual or display components to be displayed with data 24; format data 30 for defining the color, font, size, spacing and other features or formats of data 24 and elements to be displayed; and positional data 32 for defining the position, orientation, or movement of data 24 and elements in grid 58.

Database 20 stores display components 34 that graphically represent planes, labels, graphs, charts, data 24, and other components to be displayed in display system 10. In one embodiment, display system 10 generates and maintains a specific display component 34 for each entry of data 24 and each element to be displayed. Databases 18 and 20 may include random access memory (RAM), read only memory (ROM), CD-ROM, removable or fixed magnetic storage media, or any other suitable volatile or non-volatile memory.

Also coupled to bus 22 are an input module 40, a central processing unit (CPU) 42, and a graphics module 44. Input module 40 is coupled to a pointing device 46, such as a two-dimensional or three-dimensional mouse, spaceball, data glove, touch screen, light pen, pressure pad, or any other suitable pointing or input device. Input module 40 is also coupled to a keyboard 48 or other suitable keyed input device and a microphone 50.

Database 52, which may include the memory technologies discussed above with reference to databases 18 and 20, operates to store selected data 53 that represents a portion of data 24 maintained in database 18. A spreadsheet module 54 accesses selected data 53 stored in database 52 and provides conventional spreadsheet functions that allow deletion, creation, or modification of selected data 53. Graphics module 44 is coupled to a display 56 which displays display components 34 stored in database 20 as a grid 58 for perception by the user of display system 10. Display 56 may include a cathode ray tube (CRT), liquid crystal display (LCD), other flat panel display, head-mounted display, projection system, immersion room, or any other visual display device.

Display system 10 may operate on one or more computers that include an input device, such as pointing device 46, keyboard 48, and microphone 50, or other devices that can accept information. Output devices, such as display 56, convey information associated with the operation of display system 10, including visual information, digital data, or audio information. Both input devices and output devices in display system 10 may also include fixed or removable storage media, such as magnetic computer disks, CD-ROM, or other suitable media to receive output from or to provide input to display system 10. Input module 40, CPU 42, and graphics module 44 operate on one or more processors with associated volatile or nonvolatile memory that execute instructions and manipulate information in accordance with the operation of display system 10. In a particular embodiment, display system 10 comprises a computer operating in a UNIX environment, such as a SUN or SILICON GRAPHICS workstation.

It should be understood that databases 18 and 20 are illustrated for discussion purposes as separate memories. However, databases 18 and 20 may be an integral memory operated on by input module 40, CPU 42, and graphics module 44. Moreover, display system 10 need not generate and store display components 34, but may instead generate information to display grid 58 directly from information stored in database 18. It should be understood that the present invention contemplates any graphical environment or technique to generate and display grid 58 in response to the information stored in database 18.

In operation, data from data source 12 is extracted by query module 14 and passed to format module 16 of display system 10. Format module 16 transforms the data into a suitable format for display system 10, which is stored in database 18. One or more data sources 12 may provide all or a portion of data 24 and display data 26 stored in database 18. In general, the information stored in database 18 may be retrieved from one or more external sources, such as data source 12, generated internally by display system 10, or generated and modified by a user of display system 10 using input module 40, spreadsheet module 54, or both.

CPU 42, graphics module 44, or both, retrieve information from database 18 to generate display components 34 for storage in database 20. This may be performed using any appropriate graphical format, language, or representation, such as Graphical Language (GL) used by SILICON GRAPHICS devices, Open GL, Graphics Interchange Format (GIF), Joint Photographic Experts Group (JPEG) standards, or any other suitable format or standard. In one embodiment, each display component 34 corresponds to an entry in data 24 or an element specified in element data 28. Data 24 and elements represented by display components 34 are formatted in accordance with format data 30 and positioned in display 56 in accordance with positional data 32.

After initially displaying display components 34, a user of display system 10 may modify the display of grid 58 using input module 40, spreadsheet module 54, or both. Using pointing device 46, keyboard 48, or microphone 50, a user generates input data that is passed from input module 40 to CPU 42 for processing. Input data may then be used to modify information stored in database 18. For example, a user operating pointing device 46 may provide input data that specifies a repositioning of grid 58 in display 56. This input data updates the positional data 32 and, as a result, new display components 34 are generated for display by display 56. Input data may also modify or provide element data 30 to add, delete, modify, or move elements in grid 58. Similarly, input data may modify or provide format data 32 to specify formats or features for grid 58.

A user of display system 10 may also modify the display of grid 58 using spreadsheet module 54. Using input module 40 and pointing device 46, keyboard 48, or microphone 50, a user selects a portion of data 24 for storage as selected data 53 in database 52. Selected data 53 may be deleted, added to, or modified in any manner using traditional spreadsheet functions provided by spreadsheet module 54. After or while still performing spreadsheet functions, selected data 53 may be used to update portions of data 24 stored in database 18. The use of spreadsheet module 54 provides a traditional user interface to select and modify data for redisplay in a three dimensional environment.

Figure 2:
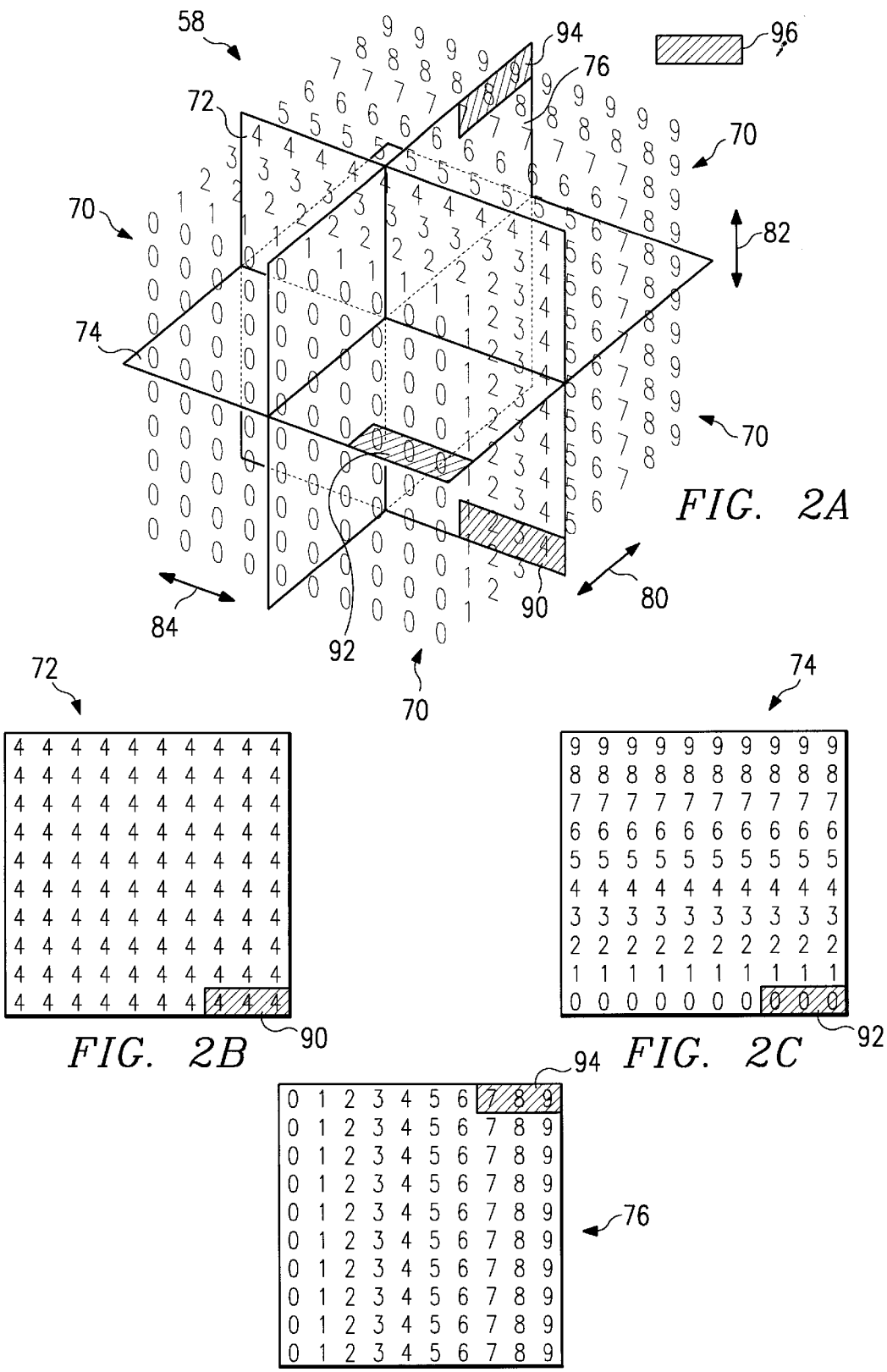
FIGS. 2A and 2D illustrate an exemplary grid generated by the display system.

FIGS. 2A through 2D illustrate in more detail grid 58 that appears on display 56. As shown in FIG. 2A, grid 58 includes data entries 70 arranged in three dimensions, for example, as a block or cube of data. Each data entry 70 represents an entry of data 24 stored in database 18, and may be textual information, numeric information, alphanumeric data in general, or any other form of information that may be displayed as data entry 70 in three dimensional space. For clarity, data entries 70 shown in FIG. 2A are single digit entries arranged in a cube, but the present invention contemplates any arrangement, mixture, or structure of alphanumeric data in any three dimensional space. Display system 10 orients and highlights data entries 70 to promote readability by the user in response to the orientation of grid 58. Moreover, display system 10 may provide an assortment of orientations for data entries 70, depending on their location, to enhance the three-dimensional visual effect of grid 58.

Grid 58 also includes a number of elements associated with data entries 70. Planes 72, 74, and 76, (referred to generally as planes 72) provide visual references and highlights to data entries 70. For example, planes 72 may intersect grid 58 in a particular location and orientation to highlight selected data entries 70. In one embodiment, three planes 72, 74, and 76 may be arranged orthogonally and associated with the three axes (X, Y, Z) of grid 58. Planes 72 may be added, deleted, and moved throughout grid 58 to provide a visual reference and highlight to data entries 70. For example, using input module 40 and pointing device 46, keyboard 48, or microphone 50, a user can move planes 72, 74, and 76, as indicated by arrows 80, 82, and 84, respectively.

Grid 58 may also include labels associated with data entries 70, planes 72, or both. Labels 90, 92, and 94 (referred to generally as labels 90) are associated with planes 72, 74, and 76, respectively, and may indicate the parameters, references, or values associated with data along a respective axis of grid 58. Grid 58 may include other labels, such as label 96, that are not associated with any particular data entry 70 or planes 72. Labels 90 in FIG. 2A are illustrated as shaded boxes, which may include any graphical, textual, or other information that annotates grid 58. The present invention contemplates any number, arrangement, orientation, or positioning of labels 90 in grid 58.

FIGS. 2B through 2D illustrate planes 72, 74, and 76, respectively, with their associated data entries 70 and labels 90. For example, FIG. 2B illustrates data entries 70 of grid 58 intersected by plane 72 in its current orientation illustrated in FIG. 2A. FIGS. 2C and 2D illustrate data entries 70 intersected by planes 74 and 76, respectively. Display system 10 may highlight data entries 70 intersected by planes 72 to enhance the visual presentation of grid 58. Moreover, display system 10 allows movement of planes 72 through grid 58 as indicated by arrows 80, 82, and 84, respectively, to intersect with and highlight selected data entries 70.

Figure 3:
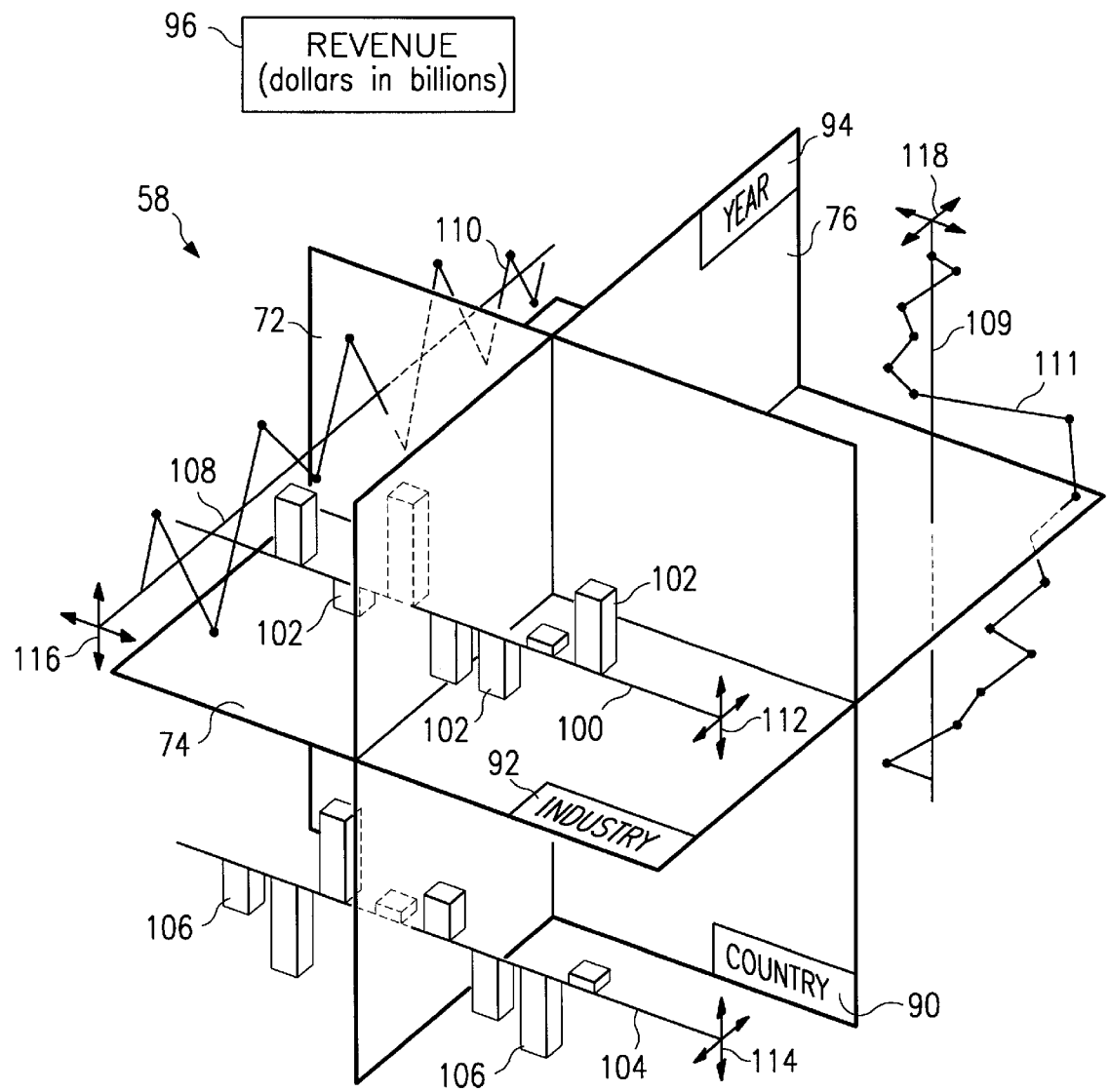
FIG. 3 illustrates additional components of the grid generated by the display system.

FIG. 3 illustrates additional components of grid 58 generated by display system 10. For clarity, grid 58 does not include data entries 70, but it should be understood that data entries 70 may be simultaneously displayed with the components shown in FIG. 3. Also, a portion or all of the components of grid 58, such as data entries 70, planes 72, labels 90, and any other components shown in FIG. 3, may be transparent or translucent and in a variety of colors and intensities to enhance the visual presentation of grid 58.

Labels in FIG. 3 reflect a particular set of data appropriate for presentation in display system 10. In particular, plane 72 and its corresponding label 90 display the "country" associated with data entries 70; plane 74 and its corresponding label 92 display the different "industry" associated with data entries 70; plane 76 and its corresponding label 94 display the "year" associated with data entries 70; and label 96 not associated with a particular plane indicates that data entries 70 represent "revenue" in billions of dollars. Using labels 90, 92, 94, and 96 as references for grid 58, a selected data entry in grid 58 may correspond to, for example, the revenue in billions of dollars generated by the electronics industry in Columbia for the year 1994. Another selected data entry may represent the revenue in billions of dollars generated by the pharmaceuticals industry in the United States for the year 1989. The country/industry/year paradigm for representing revenue figures illustrated in grid 58 is only exemplary, and display system 10 may be used in a similar fashion to visually represent any three dimensional data, such as scientific data, financial data, demographic data, or other appropriate data.

Grid 58 illustrates a number of graphics associated with data entries 70. In one embodiment, a line 100 intersects selected data entries 70 in grid 58 and provides a baseline or axis for graphically representing the value of the selected data entries 70. The value may be represented graphically by a line, two dimensional bar, three dimensional bar, or other appropriate graphics to convey to the user of display system 10 the relative values of data entries 70 intersected by line 100. In this example, each data entry 70 intersected by line 100 is represented by a bar graph 102 with a height adjusted to the value of the associated data entry 70. A similar line 104 intersecting another selected group of data entries 70 may provide the baseline or axis for additional bar graphs 106 for comparison to bar graphs 102 associated with line 100. Similarly, lines 108 and 109 provide a baseline for line graphs 110 and 111, respectively, which provides another way of visualizing selected data entries 70 in grid 58.

Display system 10 generates any appropriate graphics for visually representing values of selected data entries 70. The selected data entries 70 may be defined by a line intersecting data entries 70, a selected cluster of data entries 70 in two dimensional or three dimensional space, a plane of data entries 70, or any other grouping or association of data entries 70. The graphics associated with data entries 70 may be two dimensional or three dimensional bar charts, line graphs, three dimensional contour or topographical graphs, pie charts, or any other suitable graphics.

Graphics of data entries 70 may be oriented at any particular angle in relation to the orientation of grid 58 to visually convey information. Graphics, such as bar charts 102 and 106 and line graphs 110 and 111, may reorient or readjust as grid 58 is manipulated. Lines 100, 104, 108, and 109 may also be manipulated as shown by arrows 112, 114, 116, and 118, respectively, to select different data entries 70 and display associated graphics of the newly selected data entries 70. Display system 10 generally supports any number of graphics of selected data entries 70 in any orientation or format to allow the user of display system 10 to visually compare the values of selected data entries 70 in grid 58.

Figure 4:
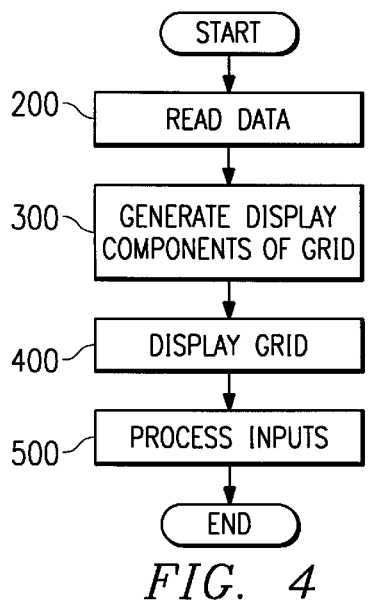
FIG. 4 is a flow chart of a method for displaying information using the display system.

FIG. 4 is a flow chart of a method for displaying information using display system 10. The method begins at step 200 where display system 10 reads data for display. Display system 10 then generates display components 34 of grid 58 at step 300 and displays grid 58 at step 400. Display system 10 processes inputs at step 500 as the user manipulates, updates, or otherwise modifies the display of grid 58. Each of the steps shown in FIG. 4 are described in more detail below.

Figure 5:
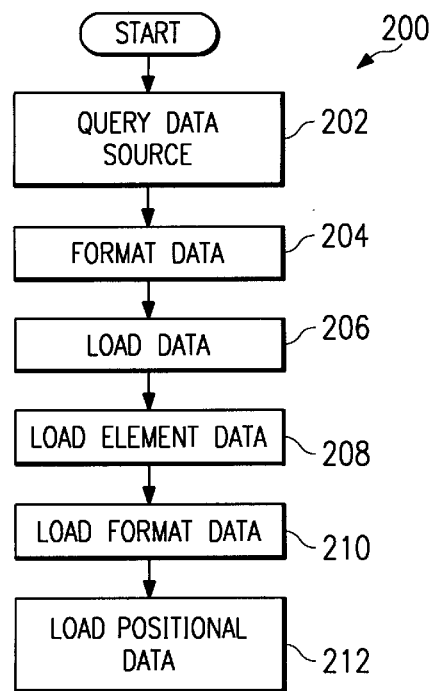
FIG. 5 is a flow chart of a method for reading data.

FIG. 5 illustrates the method of step 200 that reads data for display. Query module 14 queries data source 12 for selected data to display at step 202. Format module 16 formats the data selected by query module 14 at step 204. Display system 10 then loads data 24 into database 18 at step 206. As appropriate, display system 10 may also load element data 28 at step 208, format data 30 at step 210, or positional data 32 at step 212. All or portions of data 24, element data 28, format data 30, and positional data 32 may already reside in database 18, may be generated by display system 10, or may be specified by information from one or more data sources 12 or other external source. The present invention contemplates any internal or external source of information to populate database 18.

Figure 6:
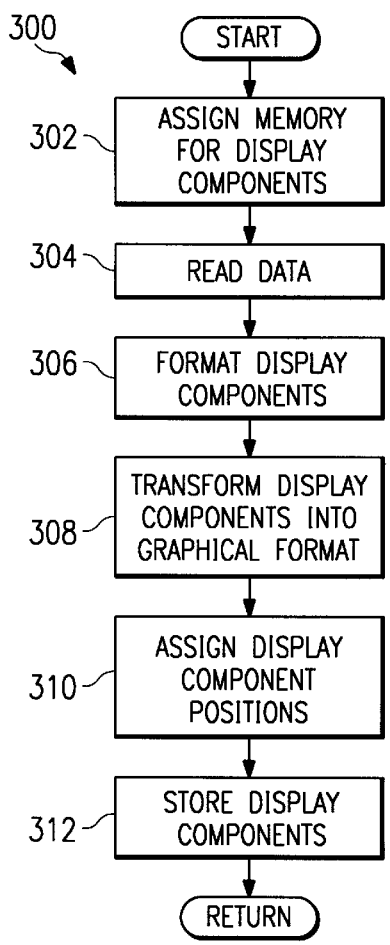
FIG. 6 is a flow chart of a method for generating display components of the grid.

FIG. 6 illustrates the method of step 300 that generates display components 34 of grid 58. The method begins at step 302 where display system 10 assigns or allocates memory in database 20 for storing display components 34 of grid 58. Display system 10 then reads data from database 18 to generate display components 34 at step 304. For example, display system 10 may read data 24 and element data 28 to determine the content, size, geometry, or other feature of data entries 70 and elements, respectively, in grid 58. Display system 10 may also read format data 30 and positional data 32 to determine the different formats and positions of display components 34 in grid 58.

Using data read from database 18, CPU 42, graphics module 44, or both CPU 42 and graphics module 44 generate display components 34 in a suitable format for display on display 56. This is accomplished by formatting display components 34 at step 306 using specified format data 30. For each display component 34, display system 10 generates a geometry at step 308 that represents display component 34 in an appropriate graphical language or format, such as Graphical Language (GL) used by SILICON GRAPHICS, Open GL, Graphics Interchange Format (GIF), Joint Photographic Experts Group (JPEG) standards, or other suitable format or standard. Display system 10 assigns positions to display components 34 in three dimensional space at step 310. The generated display components 34 are stored in database 20 at step 312.

Figure 7:
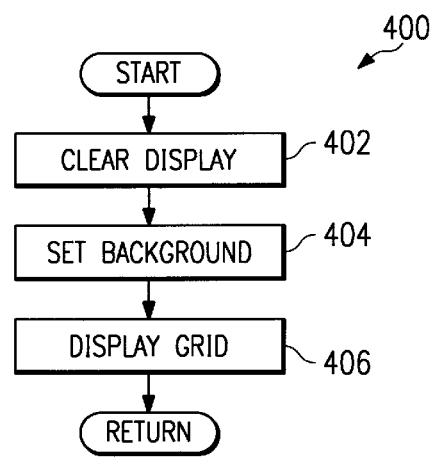
FIG. 7 is a flow chart of a method for displaying the grid.

FIG. 7 illustrates the method of step 400 for displaying grid 58 on display 56. The method begins at step 402 where display 56 is cleared. Display system 10 then sets an appropriate background at step 404, and displays grid 58 at step 406. Display system 10 may display grid 58 in a default position and orientation specified by positional data 32 before receiving input data from the user.

Figure 8:
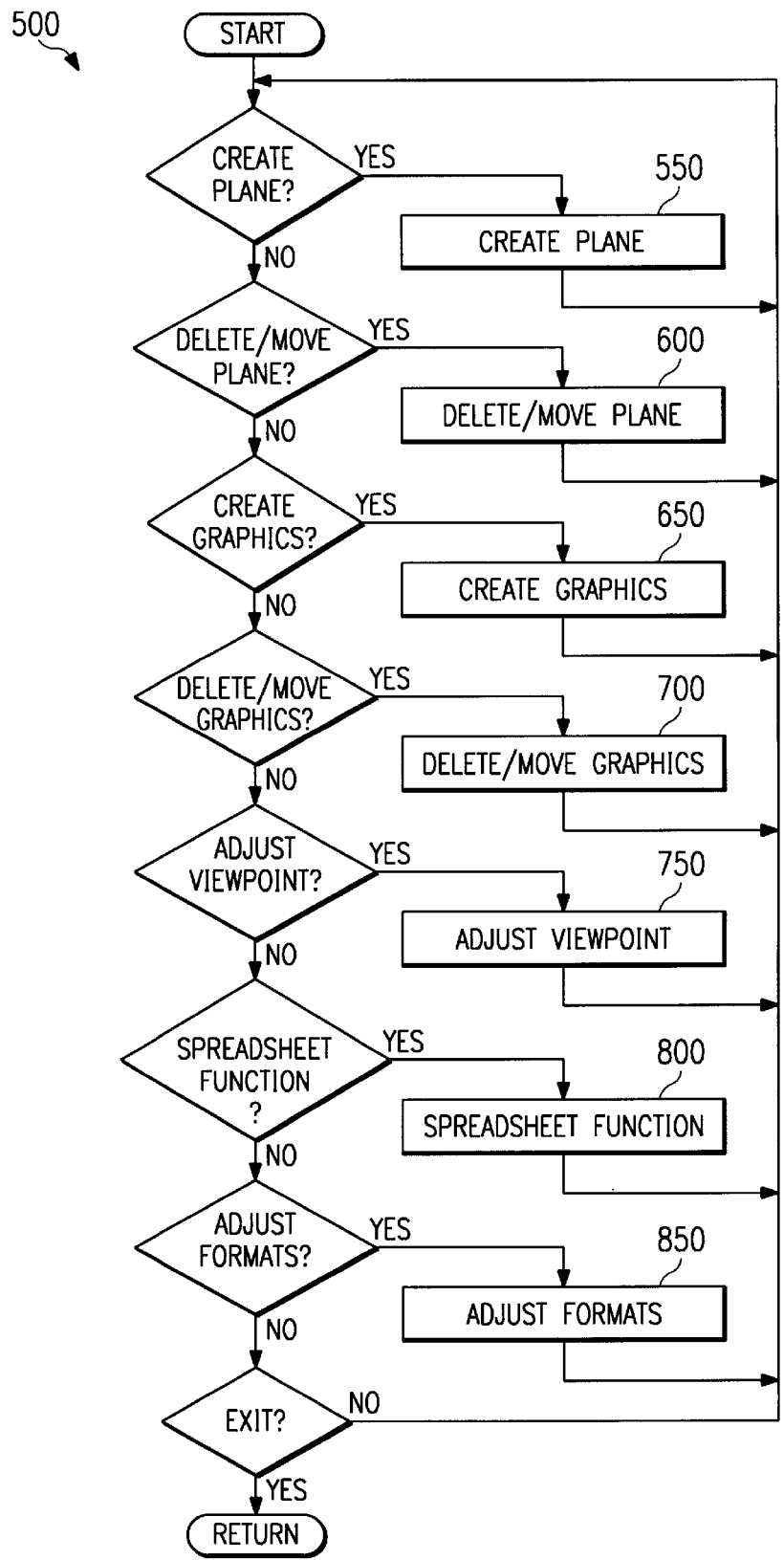
FIG. 8 is a flow chart of a method for processing inputs to the display system.

FIG. 8 illustrates the method of step 500 for processing inputs in display system 10. This method monitors the intentions of the user of display system 10 to manipulate, visualize, or otherwise modify grid 58 on display 56. Although the decision blocks of FIG. 8 are illustrated in a serial fashion, it should be understood that the present invention contemplates monitoring of input data received from input module 40 in a parallel fashion. Furthermore, the decision blocks may or may not represent prompting to the user. For example, the user may manipulate pointing device 46, execute a key sequence on keyboard 48, or issue a voice command to microphone 50 with or without receiving a prompt from display system 10.

In FIG. 8, display system 10 determines if the user desires to create a plane, and if so, the plane is created at step 550. If the user desires to delete or move a plane, the plane is deleted or moved at step 600. In a similar fashion, if the user desires to create a graph, the graph is created at step 650, and if the user desires to delete or move a graph, the graph is deleted or moved at step 700. Moreover, if the user desires to adjust its viewpoint to change the apparent orientation of grid 58 on display 56, the viewpoint is adjusted at step 750. If the user desires to perform a spreadsheet function on selected data 53, the spreadsheet function is performed at step 800. Furthermore, if the user desires to adjust the format of one or more display components 34, the formats are adjusted at step 850. FIGS. 9-15 below describe in more detail the processing blocks in FIG. 8.

Figure 9:
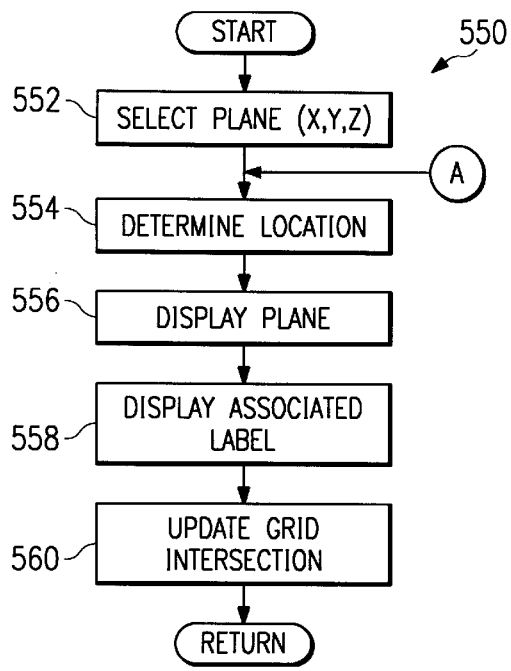
FIG. 9 is a flow chart of a method for creating a plane.

FIG. 9 illustrates a flow chart of a method to create planes 72 in grid 58. The method begins at step 552 where a plane is selected. Display system 10 identifies available planes 72 for display by their orientation to axes (X, Y, Z) of grid 58 or by some other suitable scheme. Display system 10 determines the location for a selected plane at step 554 in response to user input, a value stored in positional data 32 for the selected plane, or a default value used by display system 10. Display system 10 displays the selected and located plane at step 556 and any labels associated with the plane at step 558, and updates the grid intersection between the displayed plane, labels, and data entries 70. This may be accomplished by highlighting, changing the format, or visually modifying data entries 70 that are intersected by the displayed plane.

Figure 10:
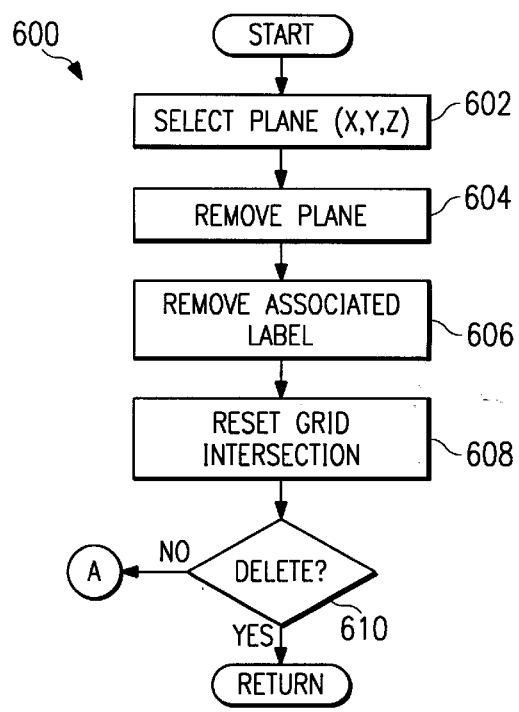
FIG. 10 is a flow chart of a method for deleting or moving a plane.

FIG. 10 illustrates a flow chart of a method to move or delete a displayed plane in grid 58. The method begins at step 602 where a displayed plane is selected. Display system 10 removes the selected plane at step 604 and labels associated with the selected plane at step 606. Display system 10 then resets the grid intersection at step 608 to indicate that the removed plane no longer intersects selected data entries 70. If the user desires to delete the plane at step 610, the method returns. However, if the user desires to move the selected plane at step 610, the method returns to step 554 in FIG. 9 to display the selected plane in its new location.

Figure 11:
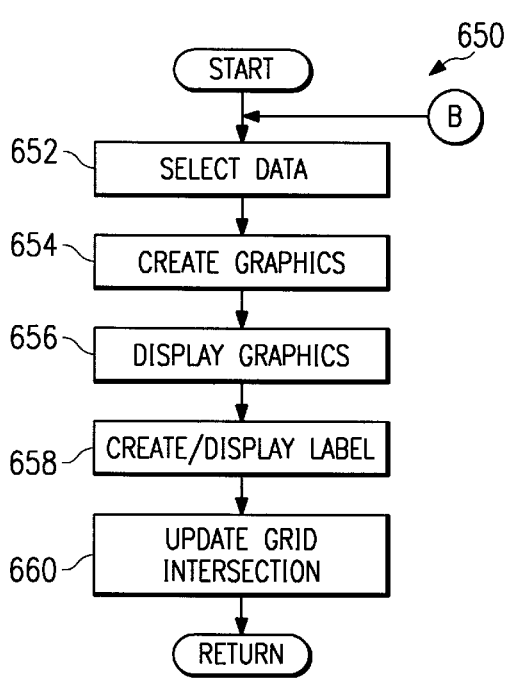
FIG. 11 is a flow chart of a method for creating graphics.

FIG. 11 illustrates a flow chart of a method to create graphics. The method begins at step 652 where data entries 70 are selected to be visually represented by graphics. Data entries 70 may be selected individually, by a line such as lines 100, 104, 108 in FIG. 3, by a plane 72, or by any other appropriate selection technique. Using the values associated with the selected data entries 70, display system 10 creates the graphics for display at step 654. These graphics may be two dimensional or three dimensional bar charts, line graphs, contour or topographical maps, pie charts, or any other visual representation of the value of selected data entries 70. The size, shape, and format of graphics may be specified by the user, stored as element data 28 or format data 30, or generated internally by display system 10. Display system 10 displays the graphics for the selected data entries 70 on grid 58 at step 656. In one embodiment, display system 10 creates and displays labels associated with the graphics at step 658. Display system 10 updates the grid intersection between the displayed graphics, labels, and data entries 70 at step 660.

Figure 12:
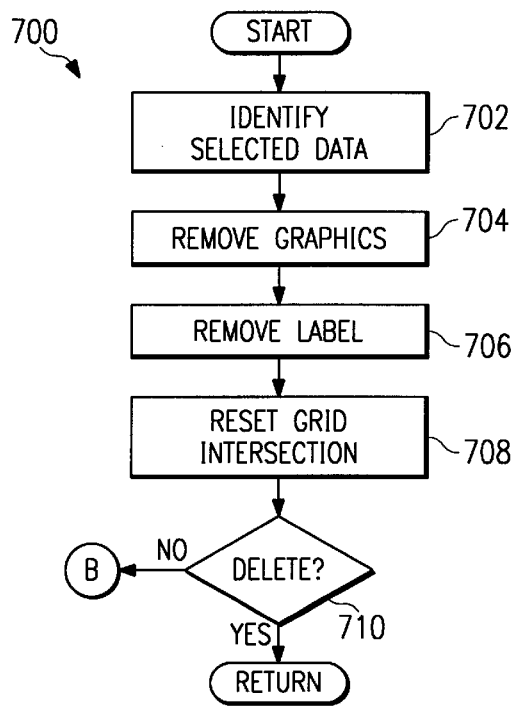
FIG. 12 is a flow chart of a method for deleting or moving graphics.

FIG. 12 is a flow chart of a method to delete or move displayed graphics. The method begins at step 702 where display system 10 identifies previously selected data entries 70 associated with displayed graphics. Display system 10 removes the graphics associated with the selected data entries 70 at step 704 and any associated labels at step 706, and resets the intersection between grid 58 and the removed graphics and labels at step 708. If the graphics are to be deleted at step 710, the method returns. However, if the graphics are to be moved, for example, by manipulating lines 100, 104, and 108 in the direction shown by arrows 112, 114 and 116 shown in FIG. 3, the method returns to step 652 of FIG. 11 to create new graphics. The user of display system 10 may delete existing graphics, select new data to graph, and graph that data by moving lines 100, 104, 108, planes 72, or any other data grouping to a new intersection with grid 58. For example, display system 10 may translate, rotate, or otherwise manipulate line 100 through grid 58 to visually display the value of different data entries 70 intersecting line 100. The present invention contemplates any number of active lines, planes, or other data groupings to visually present information on the value of selected data entries 70 to the user of display system 10.

Figure 13:
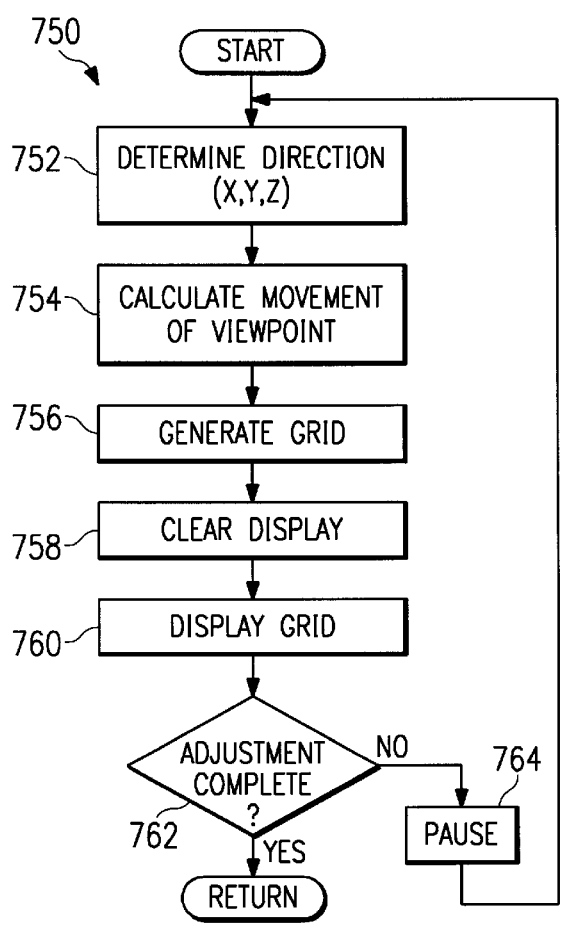
FIG. 13 is a flow chart of a method for adjusting the user's viewpoint of the grid.

FIG. 13 illustrates a flow chart of a method to adjust the viewpoint from which the user views grid 58. The method begins at step 752 where display system 10 determines the direction of movement of the viewpoint based on external input data or internally generated information. In one example, a user operating pointing device 46 may indicate two dimensional adjustments in the plane of movement of pointing device 46 and a third dimensional adjustment using the right and left buttons of pointing device 46. Upon determining the desired direction to move viewpoint, display system 10 calculates the actual movement of viewpoint in three dimensional space at step 754. Display system 10 generates display components 34 of grid 58 at step 756 in response to the movement of the viewpoint, clears display 56 at step 758, and displays grid 58 in its new orientation at step 760. Step 756 may be performed in a similar fashion as steps 306–316 of FIG. 6. If the adjustment is complete at step 762, then the method returns. However, if the adjustment is not complete at step 762, the method pauses for a predetermined time at step 764 and returns to step 752. The pause at step 764 provides a granularity of movement of grid 58 as the user of display system 10 desires a different orientation. For example, a short pause at step 764 would provide many intermediate displayed orientations of grid 58 before reaching the final desired orientation, whereas a large pause at step 764 would result in less intermediate displayed orientations.

Figure 14:
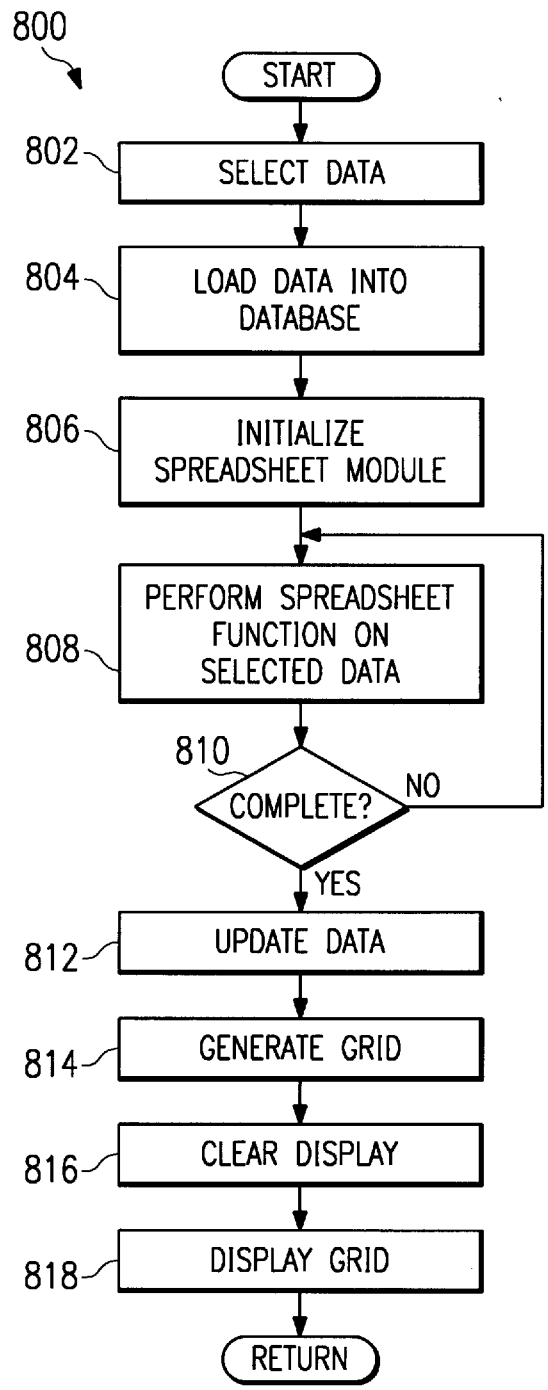
FIG. 14 is a flow chart of a method for providing spreadsheet functions to the user of the display system.

FIG. 14 is a flow chart of a method that provides a spreadsheet function to display system 10. The method begins at step 802 where display system 10 selects data entries 70 in grid 58 individually, by line, by plane, or by any other appropriate data grouping. Display system 10 stores the value of selected data entries 70 as data 53 in database 52 at step 804.

The method initializes spreadsheet module 54 at step 806 and performs a spreadsheet function on data 53 at step 808. These spreadsheet functions may be any suitable functions typically performed in a spreadsheet environment, such as entering and modifying data 53; adding, subtracting, dividing, multiplying or otherwise calculating relationships between data 53 or groups of data 53; providing statistical or financial calculations of data 53; arranging, formatting, annotating, or including labels of data 53; or any other appropriate spreadsheet function. If the spreadsheet operation on data 53 is not complete at step 810, the method returns to step 808 where display system 10 performs additional spreadsheet functions.

If the spreadsheet operation is complete at step 810, display system 10 updates data stored in database 18 with data 53 at step 812. Display system 10 generates display components 34 of grid 58 associated with data 53 at step 814. This may be accomplished in a similar manner as steps 306–312 of FIG. 6. Display system 10 clears display 56 at step 816 and displays grid 58 at step 818 to reflect modifications to data stored in database 18 by the spreadsheet function.

Figure 15:
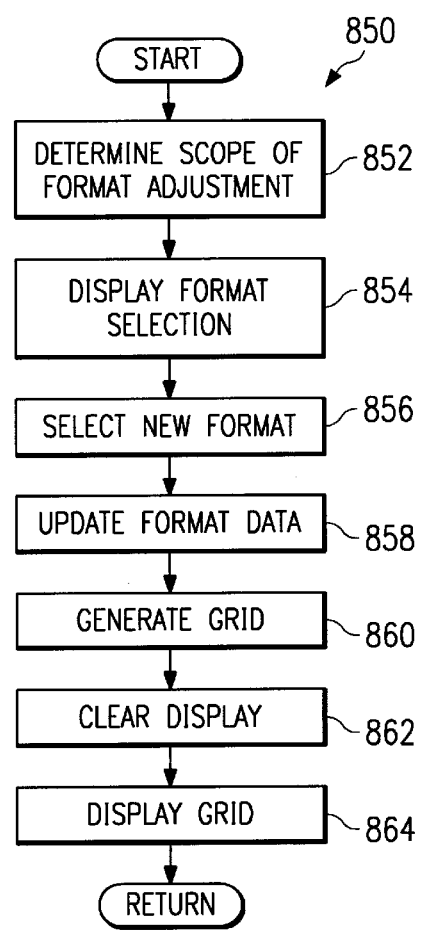
FIG. 15 is a flow chart of a method for adjusting the formats of the grid.

FIG. 15 is a flow chart of a method to adjust formats of grid 58. The method begins at step 852 where display system 10 determines the scope of format adjustment. The scope of format adjustment may be global or may apply to all or selected portions of data entries 70, planes 72, labels 90, graphics, or other display components 34 of grid 58. In one embodiment, display system 10 presents a format selection prompt to a user of display system 10 at step 854. The user selects a new format at step 856 and, in response, display system 10 updates format data 32 maintained in database 18 at step 858. Display system 10 generates appropriate display components 34 of grid 58 at step 860 using the sequence of steps 306–312 in FIG. 6. Display system 10 clears display 56 at step 862 and displays the newly formatted grid 58 at step 864.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for displaying alphanumeric data in a three dimensional grid, comprising:
    a first memory operable to store the alphanumeric data and associated display data;
    a processor coupled to the first memory and operable to transform the alphanumeric data and the display data into a format for display;
    a display coupled to the processor and operable to display the alphanumeric data and the display data in a three dimensional grid, the three dimensional grid having a plurality of planes of alphanumeric data; and
    an input device coupled to the processor, the processor operable to graphically orient the three dimensional grid to enhance user visualization of a selected plane of the alphanumeric data in response to an input from the user input device.

2. The system of claim 1, wherein the input device is operable to generate positional data that defines the orientation of the three dimensional grid.

3. The system of claim 1, wherein the display data comprises:
    first element data specifying a plane that intersects a portion of the alphanumeric data; and
    second element data specifying a label associated with the plane.

4. The system of claim 1, wherein the display data comprises:
    first element data specifying a first plane associated with a first axis of the three dimensional grid;
    second element data specifying a second plane associated with a second axis of the three dimensional grid; and
    third element data specifying a third plane associated with a third axis of the three dimensional grid.

5. The system of claim 4, wherein the input device is operable to generate positioned data that defines the position of a selected one or more of the first plane, the second plane, and the third plane.

6. The system of claim 1, further comprising:
    a second memory coupled to the processor and operable to store at least a portion of the alphanumeric data; and
    a spreadsheet module coupled to the second memory, the spreadsheet module operable to modify the alphanumeric data stored in the second memory.

7. The system of claim 1, wherein the processor comprises:
    a central processing unit; and
    a graphics module.

8. A method for displaying alphanumeric data in a three dimensional grid, comprising:
    receiving alphanumeric data and associated display data;
    transforming the alphanumeric data and the display data into a format for display;
    displaying the alphanumeric data and the display data in a three dimensional grid, the three dimensional grid having a plurality of planes of alphanumeric data; and
    graphically orienting the three dimensional grid to enhance user visualization of a selected plane of alphanumeric data in response to a user input.

9. The method of claim 8, further comprising the step of generating positional data to define the orientation of the three dimensional grid.

10. The method of claim 8, wherein the step of displaying comprises:
    displaying a plane that intersects a portion of the alphanumeric data; and
    displaying a label associated with the plane.

11. The method of claim 8, wherein the step of displaying comprises:
    displaying a first plane associated with a first axis of the three dimensional grid;
    displaying a second plane associated with a second axis of the three dimensional grid; and
    displaying a third plane associated with a third axis of the three dimensional grid.

12. The method of claim 11, further comprising the step of generating positional data to define the position of a selected one or more of the first plane, the second plane, and the third plane.

13. The method of claim 8, further comprising:

storing a portion of the alphanumeric data; and modifying the portion of the alphanumeric data using a spreadsheet module.

14. A method for displaying an element in a three dimensional grid of alphanumeric data, comprising:

receiving element data specifying the element;

transforming the element data into a format for display;

displaying the element data in a three dimensional grid of alphanumeric data, the three dimensional grid having a plurality of planes of alphanumeric data, each plane of alphanumeric data viewable by a user;

graphically orienting the three dimensional grid to enhance user visualization of a selected plane of the alphanumeric data in response to a user input; and displaying a graphic representing the alphanumeric data of the selected plane.

15. The method of claim 14, wherein the element comprises a plane intersecting selected alphanumeric data.

16. The method of claim 14, wherein the element comprises a plane intersecting selected alphanumeric data, and further comprising the step of modifying the display format of the selected alphanumeric data intersected by the plane.

17. The method of claim 14, wherein the element comprises a line intersecting selected alphanumeric data, and further comprising the step of modifying the display format of the selected alphanumeric data intersected by the line.

18. The method of claim 14, wherein the element comprises a plane intersecting selected alphanumeric data, and further comprising the steps of:

modifying the display format of the selected alphanumeric data intersected by the plane; and providing spreadsheet functions to modify the value of the selected alphanumeric data intersected by the plane.

19. The method of claim 14, wherein the element comprises a graphic representing the value of at least one entry of alphanumeric data.

20. The method of claim 14, further comprising:

receiving positional data that represents a desired movement of the element from a current location to a new location;

removing the element from the current location; and displaying the element in the new location specified by the positional data.

* * * * *